US010891263B2

(12) United States Patent
Kuchoor et al.

(10) Patent No.: US 10,891,263 B2
(45) Date of Patent: Jan. 12, 2021

(54) SYSTEMS AND METHODS FOR PROVIDING DATABASE UPDATES FOR DATA VISUALIZATION

(71) Applicant: salesforce.com, inc., San Francisco, CA (US)

(72) Inventors: Santhosh Kumar Kuchoor, Union City, CA (US); Rafael Santander, San Francisco, CA (US)

(73) Assignee: SALESFORCE.COM, INC., San Francisco, CA (US)

(*) Notice: Subject to any disclaimer, the term of this patent is extended or adjusted under 35 U.S.C. 154(b) by 584 days.

(21) Appl. No.: 15/374,906

(22) Filed: Dec. 9, 2016

(65) Prior Publication Data

US 2018/0165297 A1 Jun. 14, 2018

(51) Int. Cl.
*G06F 7/00* (2006.01)
*G06F 16/178* (2019.01)
*G06F 16/18* (2019.01)
*G06F 16/23* (2019.01)

(52) U.S. Cl.
CPC ........ *G06F 16/178* (2019.01); *G06F 16/1873* (2019.01); *G06F 16/23* (2019.01)

(58) Field of Classification Search
CPC .......... G06F 17/30174; G06F 3/04847; G06F 3/0482; G06F 16/1873; G06F 16/23; G06F 16/178
USPC ........................................ 707/602, 613, 634
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

*Primary Examiner* — Md I Uddin
(74) *Attorney, Agent, or Firm* — Schwabe Williamson & Wyatt

(57) ABSTRACT

Systems, methods, and computer-readable media for providing/obtaining database visualization updates in real-time are described. In embodiments, a user system may obtain a user input indicating a selection of a synchronization (sync) option of a set of sync options. Each sync option may indicate a desired timing for obtaining updated data for a visual representation of a dataset by a database system. The user system may send a request to obtain updated data for the visual representation of the dataset in accordance with the selected sync option. In embodiments, the selected sync option may include a real-time sync option, which when selected, the user system may obtain the updated data as the dataset is updated at the database system without sending additional requests for updates. Other embodiments may be described and/or claimed.

21 Claims, 9 Drawing Sheets

(56) References Cited

U.S. PATENT DOCUMENTS

| | | |
|---|---|---|
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,151,259 B2 * | 4/2012 | Fadell ............... H04L 29/06027 717/173 |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |

(56) References Cited

U.S. PATENT DOCUMENTS

| | | |
|---|---|---|
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0289331 A1* | 9/2014 | Chan .................... H04L 67/306 709/204 |
| 2014/0359537 A1 | 12/2014 | Jackobson et al. |

* cited by examiner

SYSTEMS AND METHODS FOR PROVIDING DATABASE UPDATES FOR DATA VISUALIZATION

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to systems and methods for updating database indexes, and in particular to systems and methods for updating database indexes during index conversion processes.

BACKGROUND

In multi-tenant database systems, customer organizations (also referred to as "tenants") may share database resources in one logical database. The databases themselves are typically shared, and each tenant is typically associated with an organization identifier (org ID) column or field that may be used to identify rows or records belonging to each tenant. Each tenant may provide their own custom data, which may include defining custom objects and custom fields, as well as designating one or more custom fields to act as custom index fields. Users of a multi-tenant database system (e.g., agents of a particular organization or tenant) may obtain data from an associated tenant space, which may be used to render/display visual representations of relevant tenant data. Due to the size of most multi-tenant database systems, and the volume of data residing in most multi-tenant database systems, it is difficult to provide updated tenant data to users in a timely manner.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
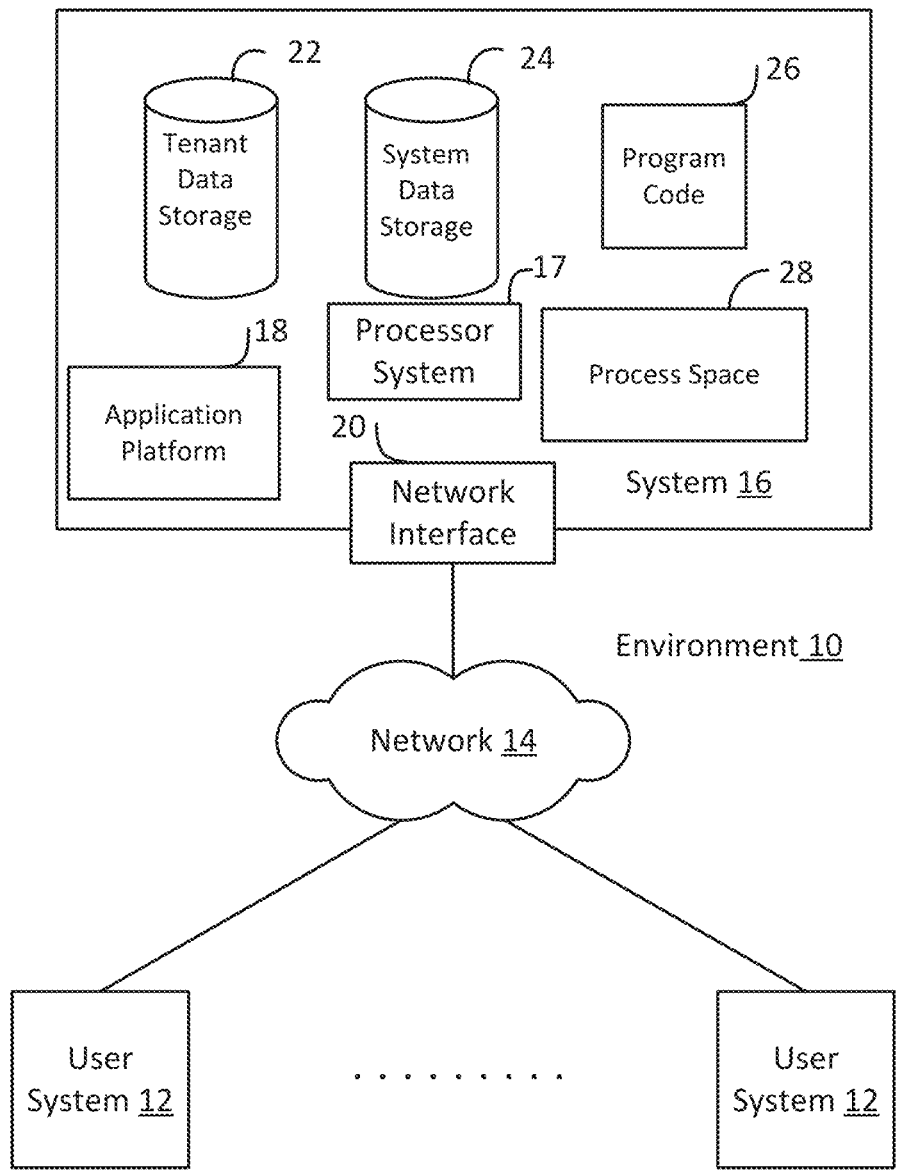
FIG. 1A shows a block diagram of an example environment in which an on-demand database service can be used according to some implementations.

Embodiments discussed herein are directed to providing database updates to user systems according to a desired synchronization option, which may include real-time or near-real-time updates. Generally, multi-tenant database systems provide updates to user systems on a periodic basis or at a specific date and time. This is mainly due to conventional system architectures, which rely on various worker nodes that perform various database functions (e.g., indexing and querying) as well as formatting data for display in various user interfaces. Embodiments allow users to select datasets to be updated in real-time or near-real-time, upon request, or on a periodic basis. This is done by utilizing cluster nodes (also referred to as "clusters" and the like) to perform the functions typically performed by conventional worker nodes. The clusters may be provided by a cloud computing service. In embodiments, when a dataset is updated or when a new dataset is created at the database system, metadata and/or timestamp information may be updated at one or more cluster nodes. Updated data of the dataset(s) may be provided to a user system based on a user-selected synchronization option, which may be used to render/display visual representations of the dataset(s) in real-time or near-real-time. Other embodiments are also described.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations.

Additionally, the conjunction "or" is intended herein in the inclusive sense where appropriate unless otherwise indicated: that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In embodiments, the tenant data storage 22, the system data storage 24, and/or some other data store (not shown) may include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16, that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), wide area network (WAN), telephone network, wireless network, cellular network, point-to-point network, star network, token ring network, hub network, or other appropriate configuration. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet. or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C. C++, HTML, any other markup language, Java™, JavaScript. ActiveX, any other scripting language, such as VBScript. and many other programming languages as are well known may be used. (Java™ is a trademark of Sun Microsystems, Inc.).

Figure 1B:
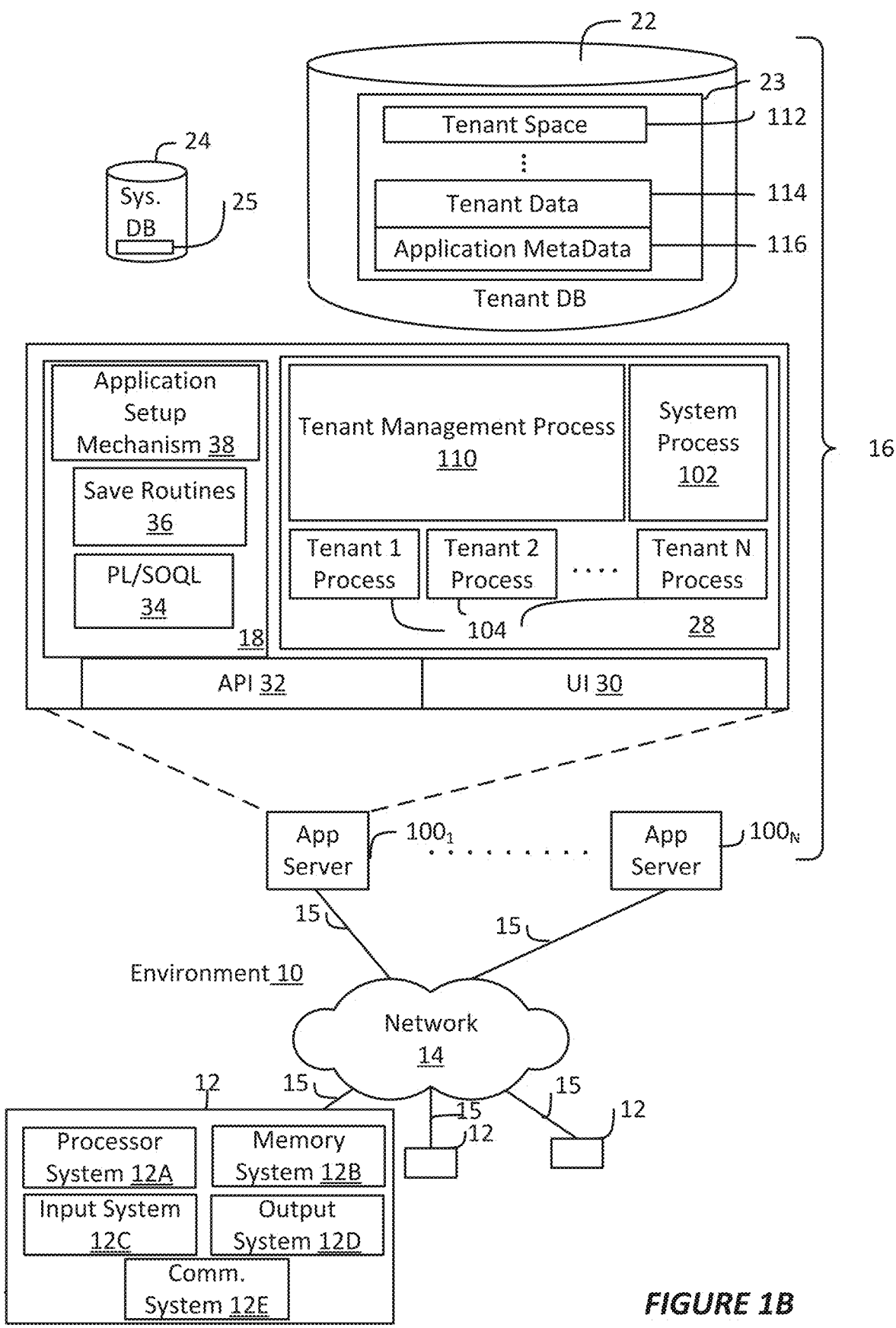
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. The processor system 12A can include any suitable combination of one or more processors, such as one or more central processing units (CPUs) including single-core or multi-core processors, one or more graphics processing units (GPUs), one or more field-programmable gate arrays (FPGAs), or any other electronic circuitry capable of executing program code and/or software modules to perform arithmetic, logical, and/or input/output operations. The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks. The communications system 12E may include circuitry for communicating with a wireless network or wired network. Communications system 12E may be used to establish a link 15 (also referred to as "channel 15," 1 networking layer tunnel 15," and the like) through which the user system 12 may communicate with the database system 16. Communications system 12E may include one or more processors (e.g., baseband processors, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols. Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches, filters, amplifiers, antenna elements, and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In FIG. 1B, the network interface 20 is implemented as a set of HTTP application servers $100_1$-$100_N$. Each application server 100 (also referred to herein as an "app server", an "ELT node", a "ETL node", a "worker node", and the like) is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection 15. For example, one application server $100_1$ can be coupled via the network 14 (for example, the Internet), another application server $100_{N-1}$ can be coupled via a direct network link 15, and another application server $100_N$ can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. In this regard, each application server 100 may be configured to perform various database functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
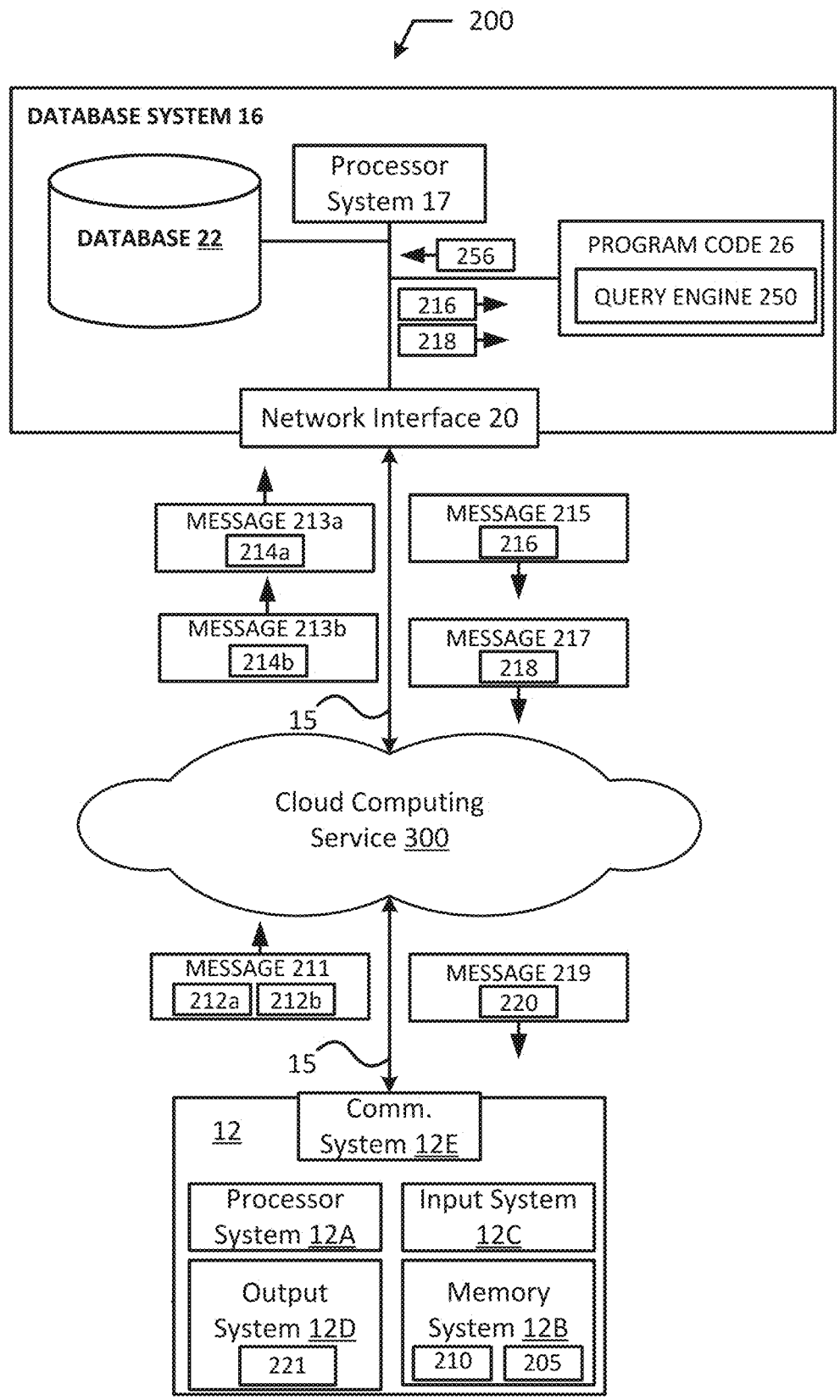
FIG. 2 shows an arrangement in which components of a user system interact with components of a database system in accordance with various embodiments.

FIG. 2 shows an arrangement 200 in which the components of a user system 12 interact with a cloud computing service 300 and components of the database system 16, in accordance with various example embodiments. As shown, the user system 12 may include the processor system 12A, the memory system 12B, the input system 12C, the output system 12D, and the communications system 12E discussed previously with regard to FIGS. 1A and 1B. The database system 16 may include the processor system 17, the network interface 20, the database 22, and the program code 26 as discussed previously with regard to FIGS. 1A and 1B.

Referring to the user system 12, the memory system 12B may include an operating system (OS) 205, application 210, and one or more databases (not shown). OS 205 may manage computer hardware and software resources, and provide common services for applications of the user system 12. OS 205 may include one or more drivers and/or APIs that provide an interface to hardware devices thereby enabling OS 205 and application 210 to access hardware functions. In some embodiments, the OS 205 may include middleware that may connect two or more separate applications or connect applications with underlying hardware components beyond those available from OS 205 and/or the drivers/APIs. The OS 205 may be a general purpose operating system or an operating system specifically written for and tailored to the user system 12.

The application 210 may be a software application designed to run on the user system 12, such as when the user system 12 is implemented in a mobile device, such as a smartphone, tablet computer, and the like. The application 210 may be a native application, a web application, or a hybrid application (or variants thereof). Application 210 may be developed with server-side development tools and/or programming languages, such as PHP, Node.js, ASP.NET, and/or any other like technology that renders HTML: using website development tools and/or programming languages, such as HTML, Cascading Stylesheets (CSS), JavaScript, JQuery, and the like; and/or using platform-specific development tools and/or programming languages (e.g., Visualforce® Android® Studio™ integrated development environment (IDE), AppleV iOS® software development kit (SDK), etc.). The term "platform-specific" may refer to the platform implemented by the user system 12 and/or the platform implemented by the database system 16. In some embodiments, the owner/operator of database system 16 may have pre-built the application 210 for use by agents of an organization/tenant, and a user of the user system 12 may be an agent of the organization/tenant. Suitable implementations for the OS 205, databases, and applications 210, as well as the general functionality of the user system 12 are known or commercially available, and are readily implemented by persons having ordinary skill in the art, particularly in light of the disclosure herein.

Regardless of whether the application 210 is implemented as a native application, web application, or hybrid application, the processor system 12A implementing the application 210 may be capable of requesting and obtaining data from database system 16, and rendering GUIs in an application container or browser. In various embodiments, the webpages and/or GUIs may include a data analytics GUI, such as Salesforce Wave™ dashboard, which may provide visual representations of data residing in an enterprise cloud or in an on-demand services environment (e.g., a tenant space within database system 16).

In embodiments, the GUI may include one or more graphical control elements, which may enable a user of the user system 12 to select a synchronization (sync) option 212a from a set of sync options for one or more selected datasets 212b (also referred to as "dataset 212b", "datasets 212b", or "dataset(s) 212b"). Additionally, the GUI may include one or more graphical control elements that allow the user of the user system 12 to select the visualization parameters (also referred to as "lens parameters" or "filters") for displaying data from one or more datasets. A dataset may be a specific view or transformation of data from one or more data sources (e.g., a tenant space of database 22, ELT/ETL vendor, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within the GUI, etc. The graphs/charts/maps to be displayed may be referred to as a "lens" or a "dashboard". A lens may be a particular view of data from one or more datasets, and a dashboard may be a collection of lenses. In embodiments, the GUI may display lenses, dashboards, and/or control panels to alter or rearrange the lenses/dashboards.

In embodiments, the sync options may indicate a timing for obtaining updated data from database 22 for a visual representation 219 of a particular dataset to be displayed by the output system 12D. For example, in various embodiments, the set of sync options may include a real-time sync option, an instant sync option, and a periodic sync option (also referred to as a "scheduled sync" option and the like). In embodiments, when the selected sync option 212a is the real-time sync option, updated data for a dataset may be obtained as records or data values in the dataset are updated at the database system 16 (e.g., in near-real-time) without requiring the user system 12 to send requests for updates. In embodiments, when the selected sync option 212a is the instant sync option, updated data for a dataset may be obtained in response to the request message 211. Using the instant sync option may require requests to be sent in the future to obtain additional updates. In embodiments, when the selected sync option 212a is the periodic sync option, updated data for a dataset may be obtained at a desired interval, such as at a specified day and/or time of day (e.g., every day at a specified time of day; once a week at a specified time of day; once a month at a specified time of day; an hourly cycle; etc.). The desired interval may also be based a time zone and/or geolocation in which the user system 12 is located.

The processor system 12A may implement the application 210 (e.g., by executing program code and/or software modules of the application 210) to generate and send a request message 211 (also referred to as "request 211", "user-issued request 211", and the like) to the database system 16. In embodiments, the request 211 may include the selected sync option 212*a* and one or more selected dataset(s) 212*b*. The request 211 may also include a query for one or more data values of the one or more datasets, records, and/or fields stored in database 22. The application 210 may utilize any suitable querying language to query and store information the database 22, such as structured query language (SQL), object query language (OQL), Salesforce® OQL (SOQL), Salesforce® object search language (SOSL), Salesforce® analytics query language (SAQL), and/or other like query languages. In embodiments, the request 211 may be an HTTP message and the selected sync option 212*a* and dataset(s) 212*b* (and query) may be located in the header or body portion of the HTTP message. Other message types may be used to convey the request 211, such as a Session Initiation Protocol (SIP) message, or any of the Internet protocol messages discussed with regard to FIGS. 1A-1B. The selected sync option 212*a* and dataset(s) 212*b* (and query) may be located in the header or body portion of such messages. Regardless of the message type, the request 211 may be sent to the cloud computing service 300 (or a node within the cloud computing service 300, which is discussed with regard to FIG. 3).

The cloud computing service 300 (also referred to as "cloud 300" and the like) may be a system of computer devices (e.g., servers, storage devices, applications, etc. within or associated with a data center or data warehouse) that provides access to a pool of computing resources. The term "computing resource" may refer to a physical or virtual component within a computing environment and/or within a particular computer device, such as memory space, processor time, electrical power, input/output operations, ports or network sockets, and the like. The cloud 300 may be a public cloud, which provides computing resources to the general public and shares computing resources across all customers/users; a private cloud, which offers cloud services to a single organization; a hybrid cloud or virtual private cloud, which uses a portion of resources to provide public cloud services while using other dedicated resources to provide private cloud services. For example, the hybrid cloud may include a private cloud service that also utilizes one or more public cloud services for certain applications or users, such as providing real-time or near-real-time updates for visual representations of datasets. In embodiments, a common cloud management platform (e.g., implemented as various virtual machines and applications hosted across the cloud 300 and database system 16) may coordinate the delivery of dataset updates such that the user system 12 may not be aware that the cloud 300 exists. In this regard, the cloud 300 may provide an Infrastructure as a Service (IaaS) or a Platform as a Service (PaaS) cloud service model. Example embodiments of the cloud 300 are discussed infra with regard to FIG. 3.

Regardless of the type of cloud services that cloud 300 provides, the database system 16 may utilize the cloud 300 (or portions thereof) to perform some or all of the functions that are typically performed by the application servers 100$_1$-100$_N$ (FIG. 1B). In various implementations, the application servers 100$_1$-100$_N$ may obtain data from various sources (e.g., database 22 and/or various other sources), create indexes for the data, convert data into a format that can be rendered by various user interfaces, process user-issued queries/requests, and the like. Typically, a single application server 100 may perform such tasks for a plurality of users and/or organizations. Most applications servers 100 incapable of processing and providing data to user systems 12 in real-time or near-real-time due to the high volume or requests/queries and the high resource utilization required to process the requests/queries. According to various embodiments, data processed for user interface consumption (e.g., user interface data 220) and provided to user systems 12 in real-time or near-real-time by offloading these tasks to various nodes within the cloud 300. Such embodiments are discussed in more detail infra with regard to FIG. 3.

In various embodiments, the cloud 300 (or a portion thereof) may obtain the request 211 from the user system 12, and may identify the selected sync option 212*a* and dataset(s) 212*b*. The cloud 300 (or a portion thereof) may store (e.g., as metadata) the selected sync option 212*a* in association with the dataset(s) 212*b*. In embodiments, the cloud 300 (or a portion thereof) may generate and send a message 213*a* including an indication 214*a* and/or a message 213*b* including a request 214*b* (also referred to as a "cloud-issued request 214*b*" and the like) to the database system 16. In some embodiments (e.g., when the selected sync option is a real-time sync option or a periodic sync option), the cloud 300 (or portion thereof) may send the indication 214*a* to indicate that the user system 12 has issued a request 211. In such embodiments, the indication 214*a* may include an instruction for the database system 16 to monitor the dataset(s) 212*b* for updated data 216, and to notify the cloud 300 when the updated data 216 exists. Updated data 216 may refer to one or more data items of the dataset(s) 212*b* that have been changed or newly generated/added to the dataset(s) 212*b*. In some embodiments (e.g., when the selected sync option is an instant sync option), the cloud 300 (or portion thereof) may send the request 214*b* for updated data 216 (e.g., updated or new data values, records, etc.) in response to receipt of the request 211 without sending the indication 214*a* or in a same message as the indication 214*a*.

In response to receipt of the indication 214*a*, the database system 16 may determine/identify when one or more data values in the selected dataset 212*b* has been updated or newly generated. Once determined/identified, the database system 16 may generate a response 217 that includes the indication 218. The indication 218 may indicate the existence of updated data 216. Once the indication 214*a* is obtained by the database system 16, the database system 16 may continuously monitor the datasets 212*b* for updated data 216 (e.g., receive indications 218 as flags or alerts from database 22 whenever the datasets 212*b* are altered), and send an indication 218 to the cloud 300 when the datasets 212*b* are updated.

In response to receiving the indication 218, the cloud 300 (or a portion thereof) may send the request 214*b* to the database system 16 according to the selected sync option 212*a*. For example, when the selected sync option is the real-time sync option, the cloud 300 (or a portion thereof) may generate and send the request 213 in response to receipt of the message 217 and/or the indication 218. In another example, when the selected sync option is the instant sync option, the cloud 300 (or a portion thereof) may generate and send the request 213 in response to receipt of the request 211 from the user system 12. In another example, when the selected sync option is the periodic sync option, the cloud 300 (or a portion thereof) may generate and send the request 213 at a desired time or on a periodic/cyclical basis. In such cases, the desired time may be based on a time selected by the user system 12 (e.g., an offset of the selected time), which may be included with the sync option 212a and/or request 211 and a timezone or geolocation in which the user system is located. For example, if the user system 12 indicates that the dataset 212b should be updated every day at 3:00 AM, then the cloud 300 (or a portion thereof) may determine the timezone of the user system 12, and determine a timing offset so that the cloud 300 (or a portion thereof) can timely obtain, process, and provide any updated data to the user system 12. Such an offset may be preconfigured (e.g., 30 minutes prior to the selected time) or dynamically set based on an update schedule, current database load parameters, and/or other like criteria.

Referring to the database system 16, program code 26 may include query engine 250, in addition to program code used for implementing the various functions of the database system 16. The program code 26, including program code of the query engine 250 may be executed by the processor system 17. The query engine 250 may be program code and/or software modules that takes a description of a search request, processes/evaluates the search request, executes the search request, and returns the results back to the calling party. Query engine technology is known to persons skilled in the database arts, and further discussion of such technology is omitted for the sake of brevity. In response to execution of the program code 26, the database system 16 may implement or perform the various tasks, operations, procedures, processes, etc. of the various embodiments discussed herein.

In embodiments, the processor system 17 implementing the query engine 250 may obtain the indication 218 that one or more data items of the dataset(s) 212b have been updated and generate the response 217 to include the indication 218. To obtain the indication 218 of the existence of the updated data 216, the database system 16 may obtain an update time of data items in the dataset(s) 212b. The update time may be an entry (e.g., metadata) in database 22 or a separate metadata data store (not shown) that indicates a time and/or date (e.g., timestamp) when data items in the dataset(s) 212b were last edited, created, and/or stored in the database 22 (e.g., by a developer or agent of an organization to which the user system 12 belongs). In embodiments, the database system 16 may determine the updated data 216 to be data items of the dataset(s) 212b that have an update time that is later than a previous a time that a request 213 was received from the cloud 300. In embodiments, the database system 16 may determine the updated data 216 to be data items of the dataset(s) 212b that have an update time that is later than a time that a response message 215 and/or 217 was sent to the cloud 300. In some embodiments, the database system 16 may determine the updated data 216 to be data items of the dataset(s) 212b that have an update time that is later than a previous login attempt by the user system 12 and/or later than a time of a previous authentication of the user system 12. Other processes for determining/identifying the updated data 216 may be used by the database system 16. The update time may be obtained based on a query (e.g., native query 256) for the indication 218, or may be automatically transferred to the query engine 250 (e.g., as a flag or alert) upon storage of any data items in the dataset(s) 212b. In embodiments, once the indication 218 is obtained by the query engine 250, the processor system 17 implementing the query engine 250 may generate the response 217, and instruct the network interface 20 to send the response message 217 (also referred to as "response 217") to the cloud 300. In embodiments, the responses 215 and 217 may be any type of Internet protocol message, such as those discussed with previously, and/or a proprietary or platform-specific message type used specifically for communicating the cloud 300.

In embodiments, in response to receiving the request 214b (which may have been sent according to the sync option 212a), the processor system 17 implementing the query engine 250 may obtain the updated data 216 for the selected dataset(s) 212b from one or more data sources (e.g., database 22, etc.) and generate the response message 215 (also referred to as "response 215") to include the updated data 216. To obtain the updated data 216, the processor system 17 implementing the query engine 250 may issue a native query 256 to the database 22 to request the updated data 216. Furthermore, the processor system 17 implementing the query engine 250 may instruct the network interface 20 to send the response 215 to the cloud 300. In embodiments, the request 213 may be any type of Internet protocol message, such as those discussed with previously, and/or a proprietary or platform-specific message type used specifically for communicating the cloud 300.

Once the cloud 300 (or a portion thereof) receives the updated data 216, the cloud 300 (or a portion thereof) may process/format the updated data 216 to obtain user interface data 220, and may generate and send a response message 219 (also referred to as "response 219") including the user interface data 220 to the user system 12. The user interface data 220 may comprise various data objects in a computer-readable form that can be compiled and rendered as a visual representation 221 by the output system 12D. For example, the user interface data 220 may be one or more Extensible Markup Language (XML) documents, one or more JavaScript Object Notation (JSON) documents, and/or some other suitable data format that may be decoded and rendered by a browser implemented by the user system 12. Once the response 219 is received by the user system 12, the processor system 12A implementing the application 210 may extract the user interface data 220 and generate a visual representation 221, which may be displayed using the output system 12D. The response 219 may be any type of Internet protocol message, such as those discussed previously.

Figure 3:
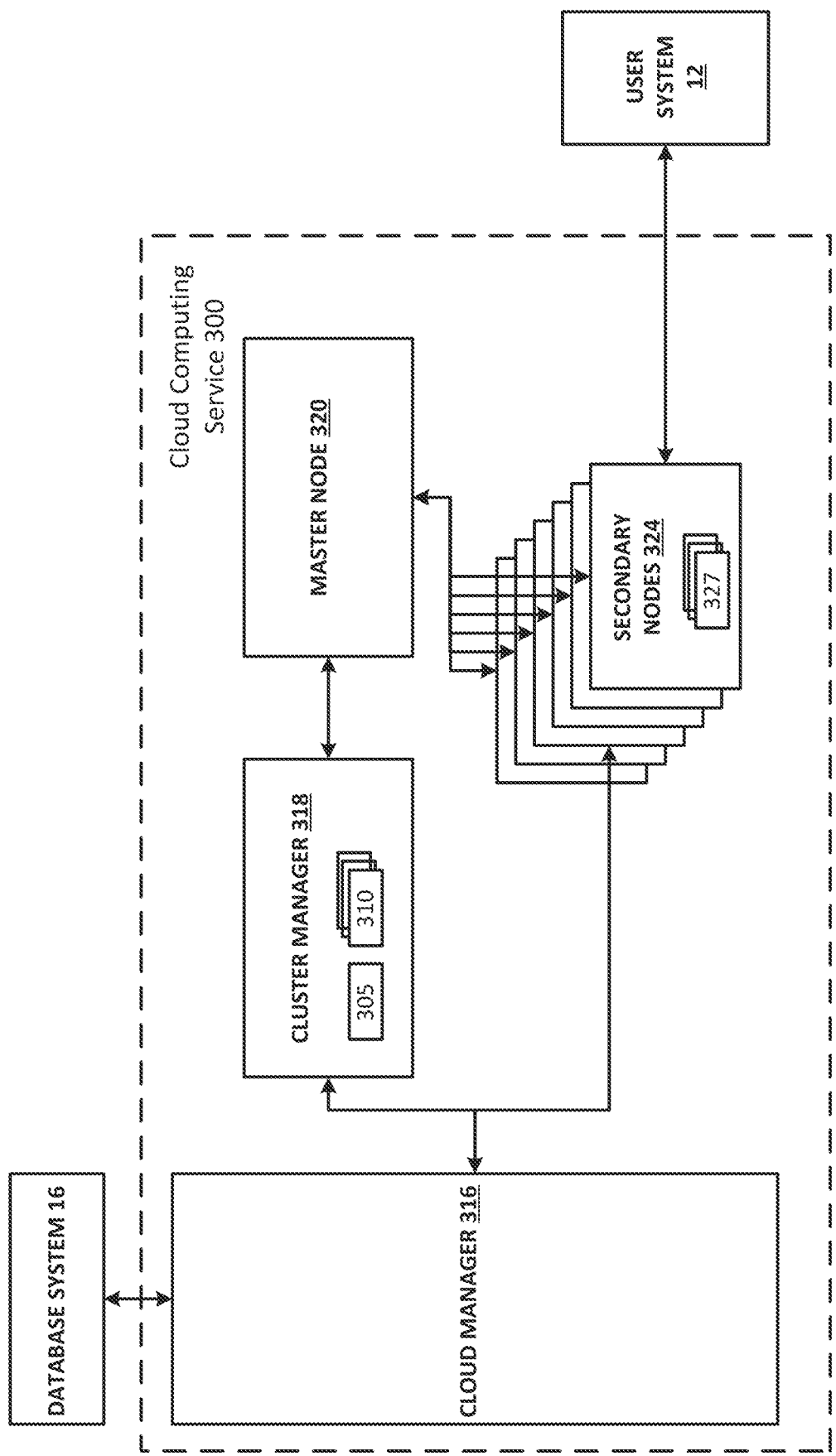
FIG. 3 shows the components of an example cloud computing service in accordance with various embodiments.

FIG. 3 illustrates the components of the cloud 300 in accordance with various embodiments. As shown, the cloud 300 may include cloud manager 316, cluster manager 318, master node 320, and secondary nodes 324. The cloud manager 316, cluster manager 318, master node 320, and secondary nodes 324 may be connected with one another via a LAN, fast LAN, message passing interface (MPI) implementations, and/or any other suitable networking technology.

The cloud manager 316 (also referred to as a "cloud management system 316", "cloud management platform 316", and the like) may be one or more computer devices (e.g., servers, virtual machines, physical or logical storage devices, physical or logical network interfaces, etc.) configured to manage use and operation of the cloud 300 (e.g., physical or logical servers, physical or logical storage devices, physical or logical network interfaces utilized by the cloud 300). Each of the one or more computer devices may include a processor system, memory systems, input systems, output systems, interface/communications systems, and/or other like components. Management of the use and operations of the cloud 300 may include managing computing resources and allocation of the computing resources, providing access to end users (e.g., database system 16 and user systems 12), monitoring and implementing security applications, system failure monitoring and recovery (e.g., self-healing), and/or other like operations. In embodiments, the cloud manager 316 may forward various messages between the database system 16 and other elements in the cloud 300.

The cluster manager 318 (also referred to as a "dynamic cluster manager 318" and the like) may be one or more computer devices (e.g., servers, virtual machines within a computer device, physical or logical storage devices, physical or logical network interfaces, etc.) configured to schedule tasks, create and/or terminate nodes (e.g., master node 320 and secondary nodes 324), perform node failure management procedures, schedule computing resources for the various nodes, and/or other like cluster management functions. Each of the one or more computer devices may include a processor system, memory systems, input systems, output systems, interface/communications systems, and/or other like components. The cluster manager 318 may act as a centralized manager for the clusters in the cloud 300 (e.g., master node 320 and secondary nodes 324) by implementing a cluster management OS 305 (also referred to as "kernel 305" and the like) for one or more distributed applications and/or frameworks 310. The OS 305 may be an OS that is specifically built to allow cluster manager 318 to perform the cluster management functions discussed previously. The OS 305 may provide and interface for frameworks 310 to access to computing resources in or at particular cluster(s). Each of the frameworks 310 may be an environment that provides particular functionality as part of a larger platform to facilitate development of various applications. Additionally, each framework 310 may be used to perform a particular function (e.g., by building various applications to perform such functions). For example, a first framework 310 may be used to perform various application server tasks (e.g., generating and sending messages 213a-b and response 219, receiving request 211 and responses 215, 217, storing sync option 212a and associated dataset(s) 212b, etc.), and a second framework 310 may be used to format/process data for user interface consumption (e.g., user interface data 220). In this regard, each framework 310 may include a scheduler (not shown) that may schedule tasks/jobs (not shown) for various secondary nodes 324 to execute. Each framework 310 may register with the master node 320 so that the master node 320 may offer secondary node 324 resources to each framework 310 for execution of the tasks/jobs. In embodiments, the OS 305 may be an Apache® Mesos™ cluster manager. In such embodiments, the frameworks 310 may be Apache® Hadoop™, Apache® Aurora™, Apache® Chronos™, Apache® Marathon™, Apache® Spark™, WildFly™ provided by Red Hat, Inc., Memecached, MPI, and Node.js, Ruby on Rails, and/or the like. In addition, the cluster manager 318 may implement one or more of the same type of framework 310 (e.g., a plurality of Apache® Hadoop™ frameworks, etc.) and/or one or more different frameworks 310 (e.g., one or more Apache® Hadoop™ frameworks and one or more MPI frameworks).

The master node 320 may be one or more computer devices (e.g., servers, virtual machines within a computer device, physical or logical storage devices, physical or logical network interfaces, etc.) configured to manage the secondary nodes 324 (also referred to as "agent nodes 324", "slave nodes 324"). Each of the one or more computer devices may include a processor system, memory systems, input systems, output systems, interface/communications systems, and/or other like components. Management of the secondary nodes 324 may include implementing an allocation module 320 to obtain an indication of available resources from each secondary node 324, and to provide resource offers to the frameworks 310. In some embodiments, the master node 320 may aggregate all reported available resources across all secondary nodes 324, and may offer them to all registered frameworks 310. In embodiments, the master node 320 may determine how many resources to offer each framework 310, and each framework 310 may accept or reject resource offers from the master node 320 based on the requirements of particular applications using that framework 310. Each resource offer may comprise an agent identifier (ID), one or more resource IDs and a resource amount corresponding to each resource ID, which in some embodiments, may be denoted as <agent ID: agent1, resource1: amount1, resource2: amount2, agent ID: agent 2, resource1: amount1, resource2: amount2, . . . >. In addition, the frameworks 310 may decide which tasks/jobs to be executed on the offered resources. The resource offers may be provided according to a policy, or according to a sharing scheme, such as fair sharing, strict priority sharing, etc. After the master node 320 provides the resource offer to the frameworks 310, the master node 320 may obtain an indication of one or more tasks to be executed using selected resources, and the master node 320 may provide the one or more tasks to the secondary nodes 324 that have the selected resources. The master node 320 may also provide instructions to execute the one or more tasks using the selected resources.

Each of the secondary nodes 324 (also referred to as "agent nodes 322", "slave nodes 322", etc.) may be one or more computer devices (e.g., servers, virtual machines within a computer device, physical or logical storage devices, physical or logical network interfaces, etc.) configured to execute tasks/jobs scheduled by the frameworks 310. Each of the secondary nodes 324 may have its own dedicated processor system, memory system, input systems, output systems, interface/communications systems etc., and may determine available computing resources at a given time. Each secondary node 324 may then provide an indication of the available resources to the master node 320 in a same or similar manner a discussed previously with regard to the resource offer (e.g., <agent ID, resource1: amount1, resource2: amount2, . . . >). Additionally, the secondary nodes 324 may obtain, from the master node 320, an indication of one or more tasks to be executed on the available resources with an instruction to execute particular tasks using particular ones of the available resources. Each of the secondary nodes 324 may implement an execution container 327 to execute one or more tasks provided by a corresponding one of the frameworks 310 (e.g., a first execution container 327 may correspond to a first framework 310, a second execution container 327 may correspond to a second framework 310, and so forth). In this way, each secondary node 324 may execute tasks for multiple frameworks 310 side-by-side and/or in parallel. The secondary nodes 324 may optionally send results of the task execution back to the master node 320.

According to various embodiments, and with reference to FIGS. 2-3, the cloud computing service 300 may operate as follows. The user system 12 may send a request 211, which may be routed to a secondary node 324 implementing application server functions as dictated by a first framework 310 responsible for implementing application server functionality. This secondary node 324 may extract the selected sync option 212a and associated dataset 212b from the request 211, and may control storage of this information in an associated data store (e.g., as metadata). Furthermore, this secondary, node 324 (or another secondary node 324) may send a message 213b with request 214b according to the selected sync option 212a, which may be routed to the database system 16 via the cloud manager 316. The first framework 310 may allocate tasks for generating and communicating the request 214b to any secondary node 324. Depending on the sync option 212a, the request 213 may request updated data 216 for dataset(s) 212a and/or may instruct the database system 16 to provide an indication 218 when the dataset(s) 212b have been updated.

When the dataset(s) 212b are updated with new data items, the database system 16 implementing the query engine 250 may provide a response 217 including an indication 218 of updated data 216 to the cloud 300. The response 217 and/or the indication 218 of updated data 216 may be routed to one of secondary nodes 324 based on a selection of offered resources. The selection of resources may be made by the first framework 310. Once obtained, this secondary node 324 may update metadata and/or timestamp information for the datasets 212a based on the indication 218. In some embodiments, one secondary node 324 may be responsible for obtaining the response 217 and extracting the indication 218 from the response 217, and another secondary node 234 may be responsible for updating the metadata and/or timestamp information based on the indication 218. Based on the selected sync option 212a, this secondary node 324 (or another secondary node 324) may send another request 214b for the updated data in a same or similar manner as discussed previously.

In response to the request 214b (or the other request 213), the database system 16 implementing the query engine 250 may obtain the updated data 216 in a response 215. The response 215 and/or the updated data 216 may be routed to one of secondary nodes 324 based on a selection of offered resources. The selection of resources may be made by the first framework 310.

A second framework 310, which may be responsible for implementing user interface processing functionality, may determine one or more tasks to process the updated data 216 for consumption by a user interface implemented by the user system 12. The second framework 310 may select offered resources to be used for execution of the one or more tasks, which may be provided to corresponding secondary node(s) 324 via the master node 320. These secondary nodes 324 may then execute the one or more tasks for processing the updated data 216. The processing tasks may include generating user interface data 220 to be rendered by the user system 12.

Once processed/formatted, the first framework 310 may determine one or more tasks for providing the user interface data 220 to the user system 12. The second framework 310 may select offered resources to be used for execution of the one or more tasks, which may be provided to corresponding secondary node(s) 324 via the master node 320. These secondary nodes 324 may then execute the one or more tasks for providing the user interface data 220 to the user system. Such tasks may include generating a response 219 to include the user interface data 220, and sending the response 219 including the user interface data 220 to the user system 12.

Figure 4:
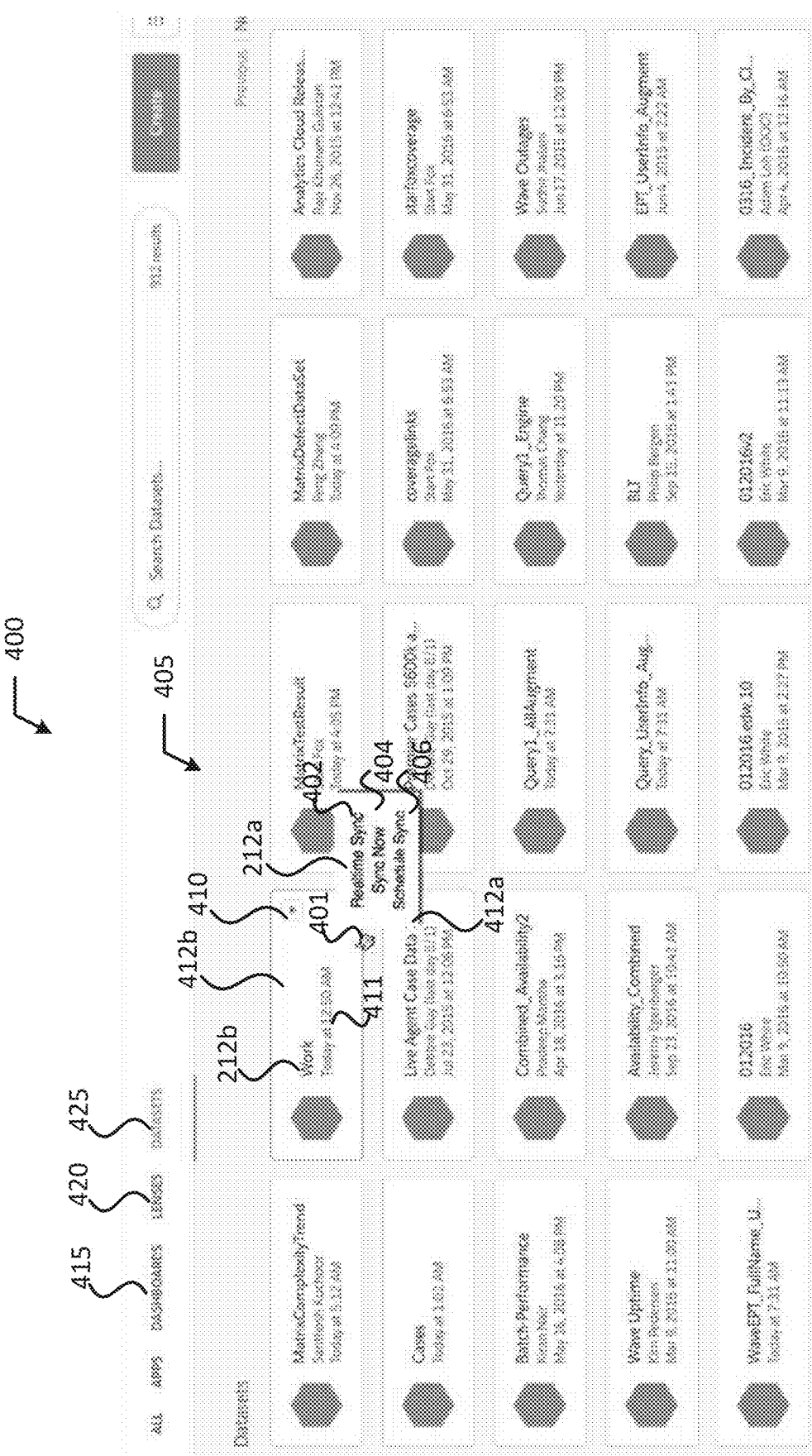
FIGS. 4-5 show example user interfaces in accordance with various embodiments.

FIG. 4 illustrates a view of GUI 400 used to select sync options 212a for one or more datasets 212b, in accordance with various embodiments. The view of the GUI 400 shown by FIG. 4 may be displayed by the output system 12D or user system 12. The GUI 400 (also referred to as a "data analytics user interface") includes dataset interface 405, which may be accessed by selecting the graphical control element 425. The graphical control element 425 may be a navigational widget (e.g., a tab) for switching between various GUIs (graphical control element 425 may be referred to as "tab 425").

In the example shown by FIG. 4, a dataset graphical control element 412b may be a representation of the dataset 212b. The dataset graphical control element 412b may be a button, icon, tab, text box, graphical object, or any other like widget or interaction element, and/or displayed in any other type of interface. The dataset graphical control element 412b may show a name of the dataset 212b (labeled "work" in FIG. 4) and an update time 411 of the dataset 212b (labeled "Today at 12:50 AM" in FIG. 4). The update time 411 may be a last time that the dataset 212b was updated at the database system 16 and/or a last time that updated data 216 was provided to the user system 12. The dataset graphical control element 412b may also include a menu graphical control element 410, which may be used to access a listing of the sync options 212a.

The sync options 212a may be listed for the dataset 212b in graphical control element 412a. As shown, the graphical control element 412a may be a drop-down list or drop-down menu, however in other embodiments, the graphical control element 412a may be any other type of widget, interaction element, and/or any other type of interface. The graphical control element 412a may be accessed by selecting the menu graphical control element 410, which may be a button, graphical object, or any other like widget or interaction element. The selection of the menu graphical control element 410 may be performed by clicking using a cursor 401 or tapping (e.g., using a finger or stylus on a touchscreen display) on the button or other object.

The sync options 212a include a real-time sync option 402 (labeled as "real-time sync" in FIG. 4), an instant sync option 404 (labeled as "sync now" in FIG. 4), and a periodic sync option 406 (labeled as "schedule sync" in FIG. 4). The functionality and/or properties of the sync options 212a is discussed previously with regard to FIGS. 2-3. Each of the sync options 212a may be represented by a graphical object. Once the graphical control element 412a is accessed, the user of user system 12 may select a graphical object for a desired sync option 212a by clicking or tapping a graphical object corresponding to a sync option 212a. Once a sync option 212a is selected, the user system 12 may generate and send the request 211 including the selected sync option 212a and the associated dataset 212b. In response, the user system 12 may obtain user interface data 220, which may be rendered by the output system 12D as a visual representation of the dataset 212b. These visual representations may be accessed and displayed by selecting one of the graphical control elements 415 and 420 (also referred to as "tabs 415 and 420").

Selecting tab 420 (labeled "lenses" in FIG. 4) may display one or more lenses, which may be a particular interactive view of various data items in the dataset 212b. Selecting tab 415 (labeled "dashboards" in FIG. 4) may display one or more dashboards, which may be a set or collection of charts, metrics, tables, graphs, etc. that provides an interactive view of various data items in the datasets 212b.

Figure 5:
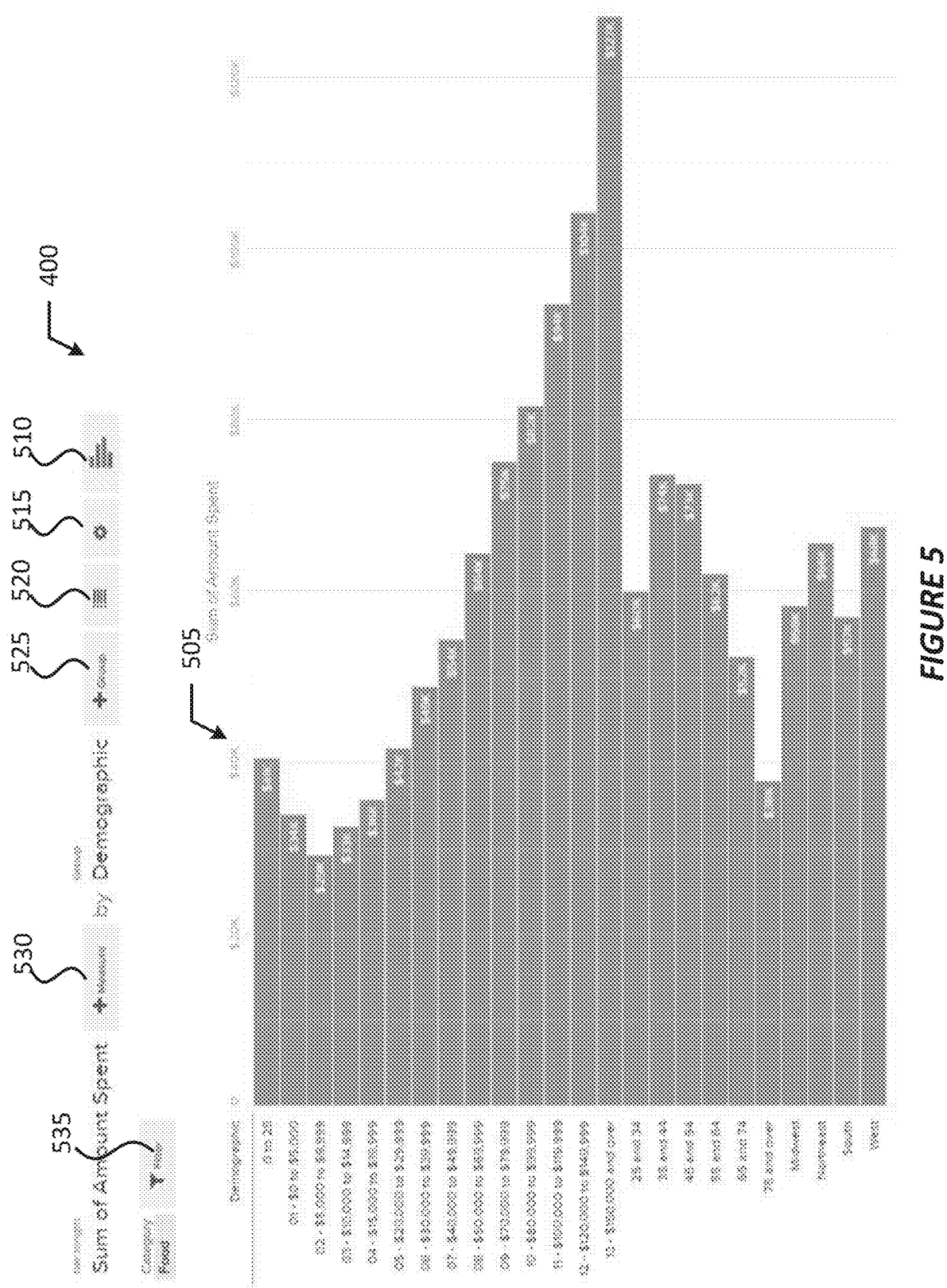

FIG. 5 shows another view of GUI 400 displaying a lens 505 for one or more datasets 212b, in accordance with various embodiments. The view of the GUI 400 shown by FIG. 5 may be displayed by the output system 12D or user system 12. In embodiments, the GUI 400 may be accessed by selecting the graphical control element 420 shown by FIG. 4. In embodiments, the lens 505 may be a type of visual representation 221. As shown, the lens 505 may include graphical control elements 510-535, which may be used to adjust or alter various visualization parameters.

In FIG. 5, the lens 505 displays a bar graph with various data items of a dataset 212b according to a "filter" (labeled as "Demographic" in FIG. 5), a "measure" (labeled "Sum of Amount Spent" in FIG. 5) and a "group" (labeled as "Food" in FIG. 5). The graph type to be shown by lens 505 may be changed by selecting a graphical control element 510 (e.g., a chart type button). Selection of the graphical control element 515 (e.g., options button) may allow the user of the user system 12 to adjust how the data in the visualization is sorted (e.g., ascending, descending, or unsorted), scaled. (e.g., logarithmic, etc.), view query based on the visualization, and/or other like options. Selection of the graphical control element 520 (e.g., export button) may allow the user of the user system 12 to save the image in a desired format (e.g., JPEG or other like image file, XML file, etc.).

Selection of the graphical control element 525 (e.g., group tab) may allow the group to be changed, and/or may allow additional groups to be added to the lens 505. The group may be one or categories associated with the dataset 212b. Selection of the graphical control element 530 (e.g., measure tab) may allow the measure to be changed, and/or may allow additional measures to be added to the lens 505. The measure may be a type of data aggregation method to be used for obtaining data items from dataset 212b. Selection of the graphical control element 535 (e.g., filter tab) may allow the filter to be changed, and/or may allow additional filters to be added to the lens 505. The filter may be one or more conditions or limits on the data to be displayed from the dataset 212b (e.g., to a particular demographic, etc.). Selection of the graphical control elements 525-535 may cause the user system 12 to request additional and/or alternative data items from dataset 212b to display in the lens 505.

Figure 6:
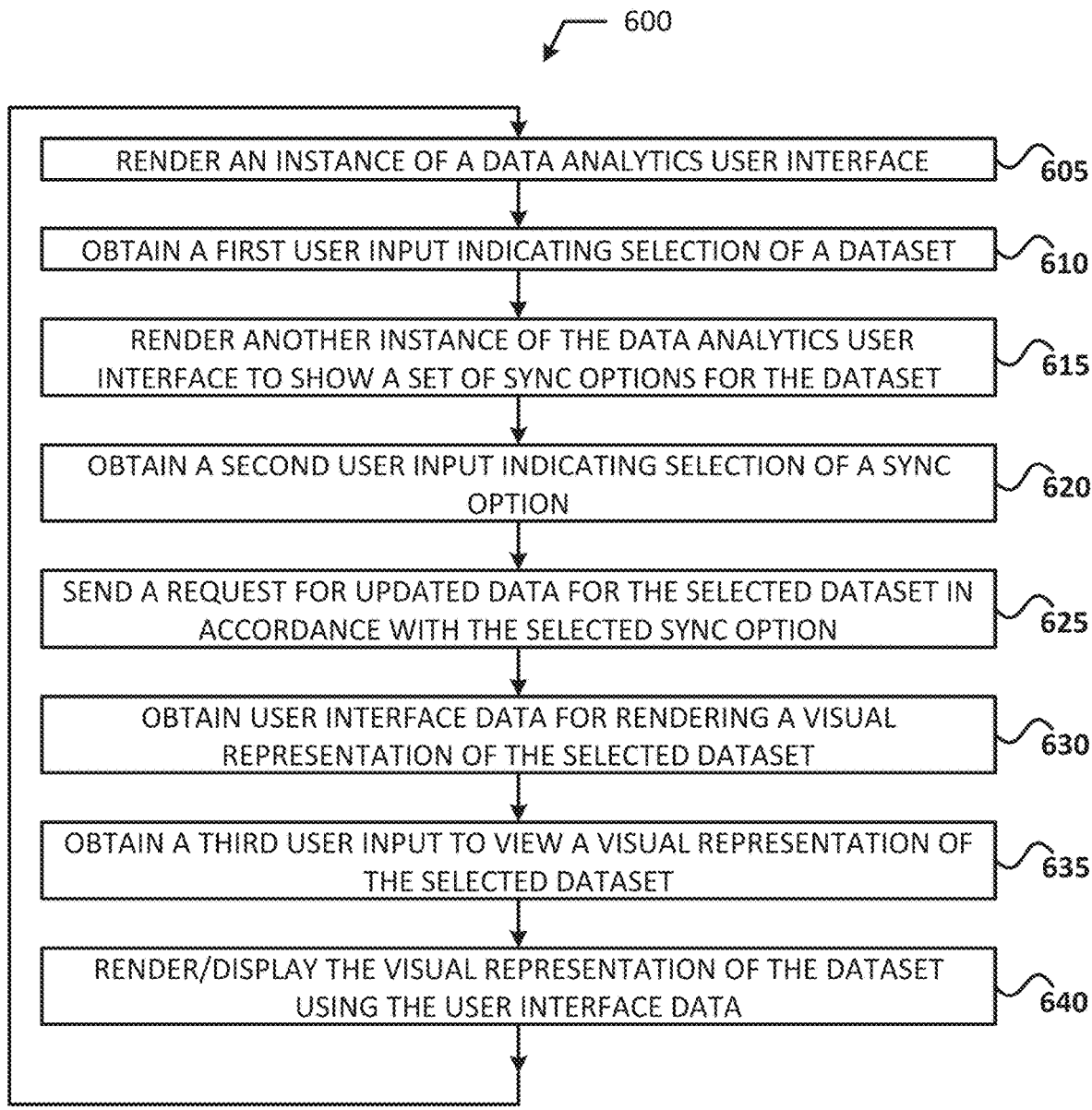
FIG. 6 illustrates a process for requesting and displaying visual representations, in accordance with various example embodiments.

FIG. 6 illustrates a process 600 for requesting and displaying visual representations 221 of datasets 212b in accordance with a sync option 212a, in accordance with various example embodiments. For illustrative purposes, the operations of process 600 are described as being performed by user system 12 discussed with regard to FIGS. 1A-B and 2-3. However, it should be noted that other computing devices may operate the process 600 in a multitude of implementations, arrangements, and/or environments. In embodiments, the user system 12 may include program code, which when executed by the processor system 12A, causes the user system 12 to perform the various operations of process 600. While particular examples and orders of operations are illustrated in FIG. 6, in various embodiments, these operations may be re-ordered, separated into additional operations, combined, or omitted altogether.

Referring to FIG. 6, at operation 605, the processor system 12A may implement an application 210 to render an instance of a data analytics user interface. In embodiments, the data analytics user interface may be the same or similar to the GUI 400 discussed previously with regard to FIGS. 4-5. At operation 610, the processor system 12A may implement an application 210 to obtain a first user input indicating a selection of a dataset 212b. In embodiments, the first user input may be obtained from the input system 12C.

At operation 615, the processor system 12A may implement the application 210 to render another instance of the data analytics user interface to show a set of sync options 212a for the dataset 212b. In an example, the other instance of the data analytics user interface may include displaying a graphical control element 412a on top of the data analytics user interface, where the graphical control element 412a may include graphical objects associated with a sync option of the set of sync options 212a. In embodiments, the set of sync options 212a may comprise a real-time sync option, an instant sync option, and a periodic sync option. At operation 620, the processor system 12A may implement the application 210 to obtain a second user input indicating a selection of a sync option 212a. In embodiments, the second user input may be obtained from the input system 12C.

At operation 625, the processor system 12A may implement the application 210 to send a request 211 for updated data 216. In embodiments, the request 211 may indicate the selected dataset 212b and the selected sync option 212a.

At operation 630, the processor system 12A may implement the application 210 to obtain user interface data 220 for rendering a visual representation of the selected dataset 212b. In embodiments, the user interface data 220 may be included with a response message 219. In embodiments, the response message 219 may be obtained via the communications system 12E. At operation 635, the processor system 12A may implement the application 210 to the processor system 12A may implement the application 210 to obtain a third user input to view a visual representation of the selected dataset 212b. In embodiments, the third user input may be obtained from the input system 12C. At operation 640, the processor system 12A may implement the application 210 to render or display the visual representation 221 of the user dataset 212b using the user interface data 220. In embodiments, the visual representation 221 may be rendered/displayed in another instance of the data analytics user interface (e.g., GUI 500 discussed with regard to FIG. 5). After operation 640, the processor system 12A may proceed back to operation 605 to render an instance of the data analytics user interface, or the process 600 may end.

Figure 7:
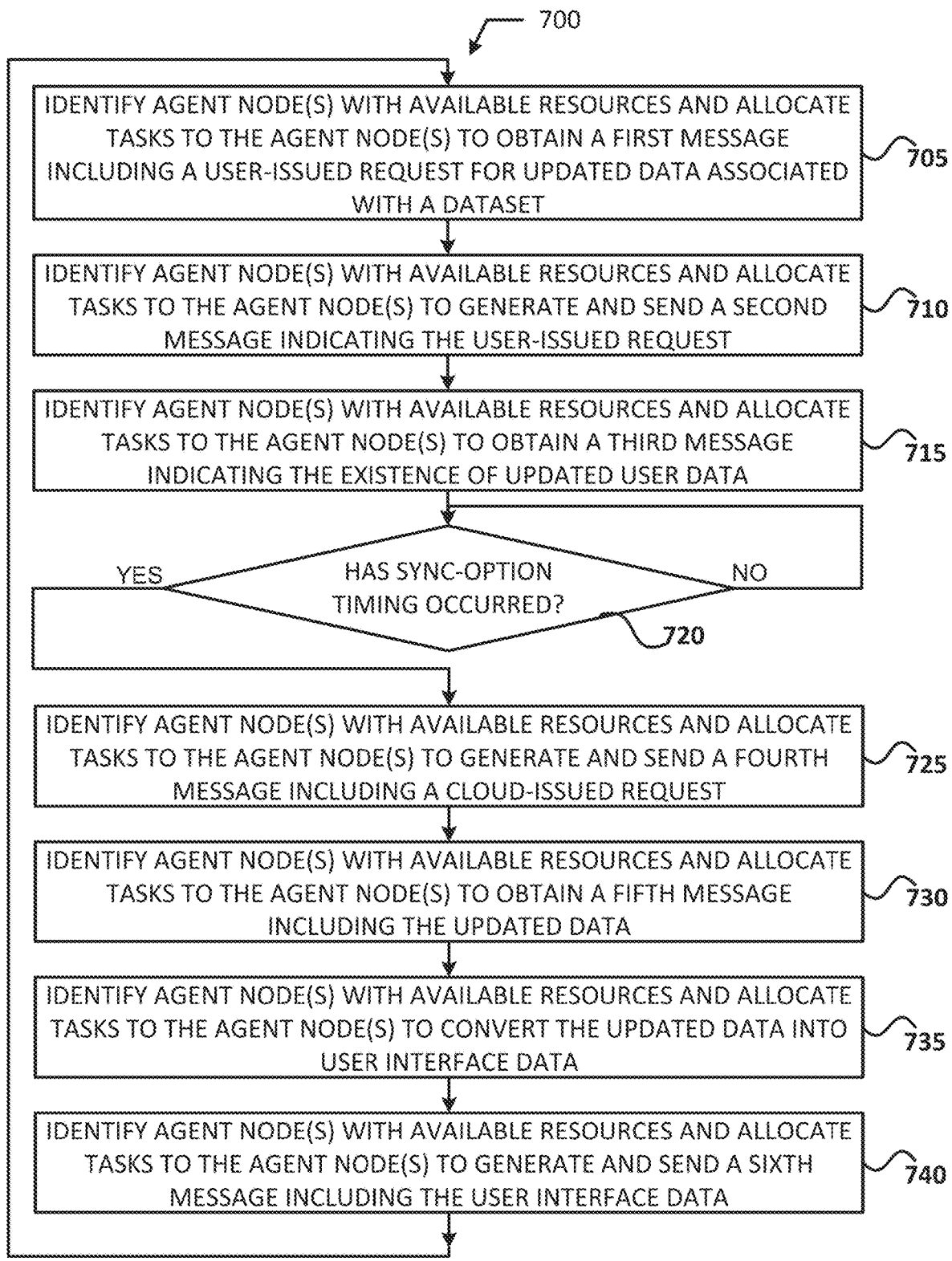
FIG. 7 illustrates a process for requesting and formatting updated data for user interface consumption, in accordance with various example embodiments.

FIG. 7 illustrates a process 700 for requesting and formatting updated data 216 for user interface consumption, in accordance with various example embodiments. For illustrative purposes, the operations of process 700 are described as being performed by the cloud 300, and in particular a cluster manager 318, discussed with regard to FIGS. 2-3. However, it should be noted that other computing devices may operate the process 700 in a multitude of implementations, arrangements, and/or environments. In embodiments, the cluster manager 318 may include program code, which when executed by a processor system of the cluster manager 318, causes the cluster manager 318 to perform the various operations of process 700. While particular examples and orders of operations are illustrated in FIG. 7, in various embodiments, these operations may be re-ordered, separated into additional operations, combined, or omitted altogether.

At operation 705, a processor system of the cluster manager 318 (herein after "cluster manager 318") may implement a first framework to obtain a first message, which may be (or include) a user-issued request 211 for updated data 216 associated with a dataset 212b. In embodiments, the first framework may be a framework used for implementing application server functionality, which may include one or more applications that control the agent nodes 324 to execute application server related tasks or otherwise act as application servers. In embodiments, the user-issued request 211 may indicate a dataset 212b and a selected sync option 212a. In embodiments, at operation 705 (or at operation 710 discussed infra) the cluster manager 318 may implement the first framework to identify agent node(s) 324 with available resources and allocate tasks to the identified agent node(s) 324 to extract and store the sync option 212a and the associated dataset 212b.

At operation 710, the cluster manager 318 may implement the first framework to generate and send a second message 213*a* including an indication 214*a* indicating the user-issued request 211. At operation 715, the cluster manager 318 may implement the first framework to identify agent node(s) 324 with available resources and allocate tasks to the agent node(s) to obtain a third message 217 including an indication 218 indicating the existence of updated user data at the database system 16.

At operation 720, the cluster manager 318 may implement the first framework or a second framework to determine whether the selected sync option 212*a* timing has occurred. In an example, when the selected sync option 212*a* is a real-time sync option, the sync option 212*a* timing may occur after receipt of the third message 217 and/or the indication 218. In another example, when the selected sync option 212*a* is an instant sync option, the sync option 212*a* timing may occur after receipt of the user-issued message 211. In another example, when the selected sync option 212*a* is a periodic sync option, the sync option 212*a* timing may occur after a desired timing occurs or after a update-request timer elapses. In embodiments, the desired timing may be based on a date and/or time selected by the user system 12 and/or a timezone (or geolocation) in which the user system 12 is located.

If at operation 720, the cluster manager 318 determines that the selected sync option 212*a* timing has not occurred, then the cluster manager 318 may loop back to perform operation 720 until the selected sync option 212*a* timing has occurred. If at operation 720, the cluster manager 318 determines that the selected sync option 212*a* timing has occurred, then the cluster manager 318 may proceed to operation 725 to generate and send a cloud-based request 214*b*. At operation 725, the cluster manager 318 may implement the first framework to generate and send a fourth message 213*b* including a cloud-issued request 214*b*. The cloud-issued request 214*b* may be used to request the updated data 216 and may be sent according to the selected sync option 212*a* as discussed previously.

At operation 730, the cluster manager 318 may implement the first framework to obtain a fifth message 215 including the updated data 216 from the database system 16. At operation 735, the cluster manager 318 may implement the second framework to convert the updated data 216 into user interface data 220. In embodiments, the second framework may be a framework used for implementing user interface formatting functionality, which may include one or more applications that control the agent nodes 324 to execute user interface related tasks or otherwise act as servers that provide various user interface related services. At operation 740, the cluster manager 318 may implement the first framework to generate and send a sixth message 219 including the user interface data 220. After operation 740, the cluster manager 318 may proceed back to operation 705 to repeat the process 700, or the process 700 may end.

According to various embodiments, operations 705-740 may include the cluster manager identifying agent node(s) 324 with available resources and allocating tasks to the available agent node(s) 324. The identification of the available agent node(s) 324 at operations 705-740 may be based on a resource offer from a master node 320. The resource offer may include available resources of the available agent node(s) 324. In embodiments, the cluster manager 318 may obtain a resource offer from the master node 320. The resource offer may indicate a set of available computing resources provided by the available agent node(s) 324. In embodiments, the cluster manager 318 may implement the first framework or the second framework to select, from the resource offer, a portion (e.g., one or more computing resources) of the available computing resources for execution of first tasks or second tasks by the available agent node(s) 324. The first tasks may refer to one or more tasks (e.g., application server related tasks) identified and allocated by the first framework, and second tasks may refer to one or more tasks (e.g., user interface related tasks) identified and allocated by the second framework. In embodiments, the allocation of tasks to the available agent node(s) 324 at operations 705-740 may include identifying the first tasks or the second tasks to be executed by the available agent node(s) 324, and providing the master node 320 with the first tasks or the second tasks and the selected portion of the available computing resources on which to execute the first tasks or the second tasks. In such embodiments, the available agent node(s) 324 may allocate individual tasks of the first tasks to an execution container 327 associated with the first framework and/or allocate individual tasks of the second tasks to an execution container 327 associated with the second framework.

Figure 8:
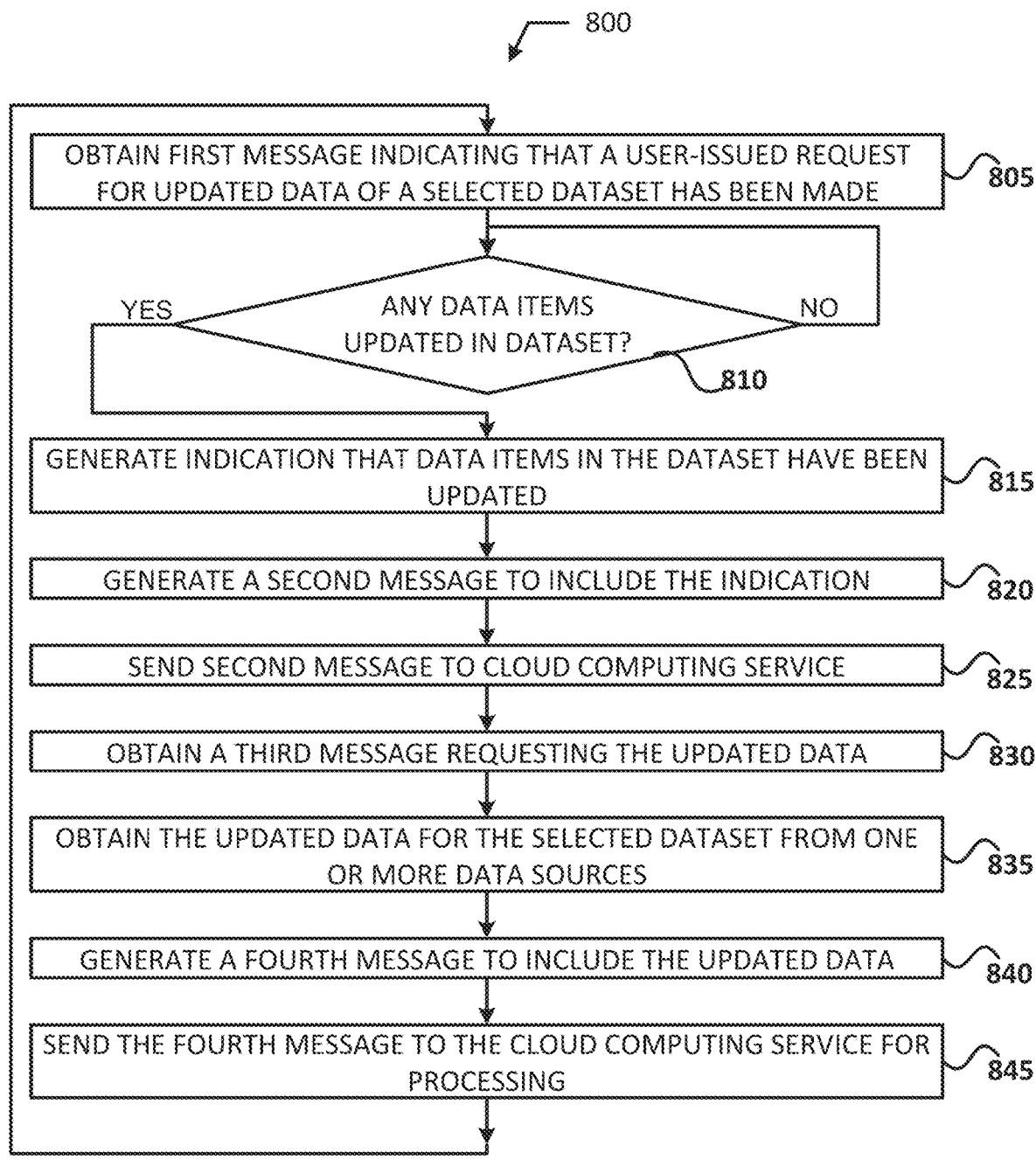
FIG. 8 illustrates a process for obtaining database records for user interface consumption, in accordance with various example embodiments.

FIG. 8 illustrates a process 800 for obtaining database records for user interface consumption, in accordance with various example embodiments. For illustrative purposes, the operations of process 800 are described as being performed by database system 16 discussed with regard to FIGS. 1A-B and 2-3. However, it should be noted that other computing devices may operate the process 800 in a multitude of implementations, arrangements, and/or environments. In embodiments, the database system 16 may include program code 26, which when executed by the processor system 17, causes the database system 16 to perform the various operations of process 800. While particular examples and orders of operations are illustrated in FIG. 8, in various embodiments, these operations may be re-ordered, separated into additional operations, combined, or omitted altogether.

Referring to FIG. 8, at operation 805, the processor system 17 may implement a query engine 250 to obtain first message 213*a* including an indication 214*a* indicating that a user-issued request 211 for updated data 216 of a selected dataset 212*b* has been made.

At operation 810, the processor system 17 implementing the query engine 250 may determine whether any data items have been updated in the dataset 212*b*. If at operation 810 the query engine 250 determines that no data items have been updated in the dataset 212*b*, the then query engine 250 may loop back to perform operation 810 until a data item has been updated in the dataset 212*b*. If at operation 810 the query engine 250 determines that at least one data item has been updated in the dataset 212*b*, the then query engine 250 may proceed to operation 815 to generate an indication 218.

At operation 815, the processor system 17 may implement the query engine 250 to generate an indication 218 indicating that one or more data items in the dataset 212*b* have been updated. In embodiments, generating the indication 218 may be based on an alert or flag issued by one or more data sources, and/or may include other uniquely identifying information, such as a timestamp of the update; a unique identifier (ID) associated with the dataset 212*b*, organization (org_id), user system 12, etc.; an index associated with the updated entry; and/or other like information. At operation 820, the processor system 17 may implement the query engine 250 to generate a second message 217 to include the indication 218, and at operation 825, the processor system 17 may implement the query engine 250 to send the second message 217 to cloud computing service 300.

At operation 830, the processor system 17 implementing the query engine 250 may obtain (e.g., via the network interface 20) a third message 213*b* including a request 214*b* for the updated data 216. At operation 835, the processor system 17 may implement the query engine 250 to obtain the updated data 216 for the selected dataset 212b from one or more data sources. In embodiments, the query engine 250 may issue one or more queries to the one or more data sources. In response to receipt of the updated data 216, at operation 840 the processor system 17 may implement the query engine 250 to generate a fourth message 215 to include the updated data 216. At operation 845, the processor system 17 may implement the query engine 250 to send the fourth message 215 to the cloud computing service 300 for processing (see e.g., FIG. 7). After operation 845, the processor system 17 may proceed back to operation 805 to repeat the process 800, or the process 800 may end.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2 by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A computer program stored on one or more non-transitory computer-readable media, the computer program to be implemented by a user system, the computer program comprising instructions, wherein execution of the instructions is operable to cause the user system to:
    obtain a user input of a selection of a synchronization (sync) option of a set of sync options to synchronize locally stored data items of a dataset with data items of the dataset stored in a remote database system, each sync option of the set of sync options indicates a desired timing for obtaining updated data items for a visual representation of the dataset in a data analytics graphical user interface (GUI), and the set of sync options include a real-time sync option, an instant sync option, and a periodic sync option;
    send, in response to the user input, a request to a cloud computing service to obtain updated data items from the database system for the visual representation of the dataset in the data analytics GUI in accordance with the selected sync option,
    the request to cause the cloud computing service to implement a first framework using a plurality of agent nodes to: allocate, to an available agent node of the plurality of agent nodes, first tasks for receipt of the request message and second tasks to extract the updated data items and convert the updated data items into a format for display of the visual representation; and
    receive the updated data items from the cloud computing service,
        the updated data items being received in response to the request when the selected sync option is the instant sync option,
        the updated data items being received as individual data items are updated at the database system when the selected sync option is the real-time sync option, and
        the updated data items being received at a selected interval when the selected sync option is the periodic sync option.

2. The computer program of claim 1, wherein execution of the instructions is operable to cause the user system to:
    render the data analytics GUI comprising a set of sync graphical control elements (GCEs), wherein each sync GCE of the set of sync GCEs corresponds to a sync option of the set of sync options.

3. The computer program of claim 2, wherein the data analytics GUI comprises a dataset GCE, and execution of the instructions is operable to cause the user system to:
    obtain another user input indicating a selection within the dataset GCE; and
    render, within the data analytics GUI, a sync options user interface indicating each sync GCE of the set of sync GCEs.

4. The computer program of claim 2, wherein the data analytics GUI comprises a lenses GCE, and execution of the instructions is operable to cause the user system to:
    obtain another user input indicating a selection of the lenses GCE; and
    render, within the data analytics GUI, one or more views of one or more data items in the selected dataset.

5. The computer program of claim 4, wherein execution of the set of instructions is operable to cause the user system to:
    generate and render one or more updated views to additionally visually represent the updated data items as the updated data items are received when the selected sync option is the real-time sync option.

6. The computer program of claim 1, wherein execution of the instructions is operable to cause the user system to: generate the request to include the selected sync option and an identifier of the dataset.

7. The computer program of claim 4, wherein, when the selected sync option is the periodic sync option, the selected interval is based on a selected time and a timezone of the user system, and the timezone is determined based on a geolocation of the user system.

8. The computer program of claim 5, wherein execution of the instructions is operable to cause the user system to:
render, upon receipt of the updated data items, a notification user interface to indicate receipt of the updated data items; or
render, upon receipt of the updated data items, the visual representation of the dataset using the updated data items.

9. A database system comprising:
a network interface configurable to obtain a first message from a cloud computing service, the first message indicating that a user-issued request for updated data items belonging to a selected dataset has been made in accordance with a selected sync option from among a set of sync options,
the first message including a notification request when the selected sync option is a real-time sync option, the notification request is a request to be notified when data items of the selected dataset are updated,
the first message including an updated data request (UDR) when the selected sync option is an instant sync option or a periodic sync option, the UDR is a request for any updated data items of the selected dataset as of a time that the first message is received; and
a processor system coupled with the network interface, the processor system is configurable to:
when the first message includes the notification request, and in response to determination that at least one data item in the selected dataset has been updated, generate a second message to include an indication that the at least one data item has been updated, and
when the first message includes the UDR, and in response to determination that the at least one data item has been updated, generate the second message to include the at least one data item; and
the network interface is configurable to send the second message to the cloud computing service; and
the cloud computing service comprises a plurality of agent nodes to implement a first framework to: allocate, to an available agent node of the plurality of agent nodes, first tasks for receipt of the user-issued request and second tasks to extract the updated data items and convert the updated data items into a format for display of a visual representation of the selected dataset.

10. The database system of claim 9, wherein, in response to receipt of the first message including the UDR, the processor system is to:
determine whether one or more data items of the selected dataset have been changed or newly added to the selected dataset since a previous request for updated data items.

11. The database system of claim 10, wherein a node within the cloud computing service is to format and deliver the updated data items to the user system upon receipt of the second message.

12. The database system of claim 9, wherein the indication is a timestamp of an update of the at least one data item or a unique identifier associated with the at least one data item.

13. A computer program stored on one or more non-transitory computer-readable media, the computer program to be implemented by a cloud computing service comprising a plurality of agent nodes, the computer program comprising a set of instructions, wherein execution of the instructions is operable to cause a cloud computing system to:
implement a first framework to:
identify an available agent node of the plurality of agent nodes;
allocate, to the available agent node, first tasks to obtain, from a user system, a first message including a first request for updated data items, the request comprising a selected dataset and a selected sync option of a set of sync options, each sync option of the set of sync options indicates a desired timing for delivery of updated data items for a visual representation of the dataset at the user systems;
allocate, to the available agent node, second tasks to extract the updated data items and conversion of the updated data items into the format for display of the visual representation;
send a second message to a database system,
the second message including a notification request when the selected sync option is a real-time sync option, the notification request requesting to be notified when data items of the selected dataset are updated,
the second message including an updated data request (UDR) when the selected sync option is an instant sync option or a periodic sync option, the UDR requesting any updated data items of the selected dataset as of a time that the second message is received,
the second message being sent in response to receipt of the first message when the selected sync option is the real-time sync option or the instant sync option, and
the second message being sent at a user-selected time interval indicated by the first message when the selected sync option is the periodic sync option;
obtain, from the database system, a third message,
the third message including an indication that the updated data items exist at the database system when the message includes the notification request, and
the third message including the updated data items at the database system when the message includes the UDR;
generate user interface data based on a conversion of the updated data items into a format for display of the visual representation; and
send, to the user system, a fourth message, the fourth message including the user interface data.

14. The computer program of claim 13, wherein execution of the instructions is further operable to cause the computing system to implement the first framework to:
allocate, to the available agent node, the first tasks for receipt of the first message, generation and transmission of the second message, and generation and transmission of the fourth message.

15. The computer program of claim 13, wherein execution of the instructions is further operable to cause the computing system to implement a second framework to:
identify another available agent node of the plurality of agent nodes; and allocate, to the other available agent node, second tasks to extract the updated data items and conversion of the updated data items into the format for display of the visual representation.

16. The computer program of claim 15, wherein the first tasks or the second tasks further comprise identification of a geolocation of the user system and determination of a timezone of the user system based on the identified geolocation.

17. The computer program of claim 16, wherein the cloud computing service comprises a master node, and, to identify the available agent node or the other available agent node, execution of the instructions is operable to cause the computing system to:
- obtain a resource offer from the master node, wherein the resource offer indicates a set of available computing resources provided by the available agent node or the other available agent node; and
- select, from the resource offer, a portion of the available computing resources for execution of the first tasks by the available agent node or execution of the second tasks by the other available agent node.

18. The computer program of claim 17, wherein, to allocate the first tasks or the second tasks, execution of the instructions is operable to cause the computing system to:
- identify the first tasks or the second tasks to be executed by the available agent node or the other available agent node; and
- provide the master node with the first tasks or the second tasks and the selected portion of the available computing resources, and
- the available agent node or the other available agent node is to allocate individual tasks of the first tasks or the second tasks to an execution module associated with the first framework or the second framework.

19. The computer program of claim 17, wherein the available computing resources comprise a number of processor cores and an amount of available memory at the available agent node, and wherein individual computing resources comprise individual processor cores and individual memory regions at the available agent node.

20. The computer program of claim 13, wherein the user-selected time interval is based on a timezone in which the user system is located.

21. The computer program of claim 14, wherein the cloud computing service comprises a plurality of agent nodes, and execution of the instructions is operable to cause the computing system to implement a second framework to:
- allocate second tasks to a first set of available agent nodes when the selected sync option is the real-time sync option;
- allocate the second tasks to a second set of available agent nodes when the selected sync option is the instant sync option; and
- allocate the second tasks to a third set of available agent nodes when the selected sync option is the periodic sync option, and
- the second tasks are to extract the updated data items from the third message and conversion of the updated data items into the format for display of the visual representation.

* * * * *